US012206180B2

(12) United States Patent
Turpin

(10) Patent No.: US 12,206,180 B2
(45) Date of Patent: Jan. 21, 2025

(54) PLANAR MULTIBEAM HYBRID-ELECTROMECHANICAL SATCOM TERMINAL

(71) Applicant: All.Space Networks Limited, Reading (GB)

(72) Inventor: Jeremiah P. Turpin, Linthicum, MD (US)

(73) Assignee: All.Space Networks Limited, Reading (GB)

( * ) Notice: Subject to any disclaimer, the term of this patent is extended or adjusted under 35 U.S.C. 154(b) by 184 days.

(21) Appl. No.: 18/103,365

(22) Filed: Jan. 30, 2023

(65) Prior Publication Data

US 2023/0246345 A1 Aug. 3, 2023

Related U.S. Application Data

(60) Provisional application No. 63/305,522, filed on Feb. 1, 2022.

(51) Int. Cl.
*H01Q 3/14* (2006.01)
*H01Q 25/00* (2006.01)

(52) U.S. Cl.
CPC ............. *H01Q 3/14* (2013.01); *H01Q 25/008* (2013.01)

(58) Field of Classification Search
CPC .. H01Q 3/04; H01Q 3/14; H01Q 3/46; H01Q 1/02; H01Q 19/062; H01Q 25/008; H01Q 21/065
See application file for complete search history.

(56) References Cited

U.S. PATENT DOCUMENTS

| | | | | |
|---|---|---|---|---|
| 9,850,907 | B2 | 12/2017 | Kadijk | |
| 10,116,051 | B2 | 10/2018 | Scarborough et al. | |
| 2018/0115087 | A1* | 4/2018 | Besoli | H01Q 3/26 |
| 2018/0269576 | A1* | 9/2018 | Scarborough | H01Q 21/0025 |
| 2020/0350681 | A1 | 11/2020 | Scarborough et al. | |

FOREIGN PATENT DOCUMENTS

GB 2611307 A 4/2023

* cited by examiner

*Primary Examiner* — Daniel Munoz
(74) *Attorney, Agent, or Firm* — Wolf, Greenfield & Sacks, P.C.

(57) ABSTRACT

A lens array antenna system that includes a plurality of lens modules, each consisting of an RF lens and a plurality of feeds forming a linear feed region or feed array. Multiple linear feed regions supporting different frequency bands may be used. The lenses and array of feeds jointly rotate and are slidably connected to allow the location of the linear feed region relative to the focal locus of the lens to be changed by an actuator and controller to allow any two focal points corresponding to desired beam scanning directions to be covered by the linear feed region. In this way, a planar hybrid electromechanical beamforming antenna can form two independent beams in the upper hemisphere with only two mechanical actuators and a single axis of electronic beamforming, reducing production cost compared to existing multibeam antenna solutions.

30 Claims, 10 Drawing Sheets

301
303
305
302
304

307
θ=90°
θmax
θ
φ

311
315

317

321
325

327

331
335

337

341
345

347

351
352
355
302

357

601
335

607

611
613
335

617
615

621
613
623
335

627
615
625

PLANAR MULTIBEAM HYBRID-ELECTROMECHANICAL SATCOM TERMINAL

CROSS-REFERENCE TO RELATED APPLICATIONS

This application claims the benefit under 35 USC § 119(e) of provisional U.S. Application Ser. No. 63/305,522, filed Feb. 1, 2022, and entitled "PLANAR MULTIBEAM HYBRID-ELECTROMECHANICAL SATCOM TERMINAL," which is hereby incorporated by reference herein in its entirety.

The present disclosure relates to a planar electromechanical VSAT (Very Small Aperture Terminal) SATCOM (Satellite Communication) terminal that can support steering two independent receive and transmit beam pairs from a planar aperture with only two mechanical actuators.

BACKGROUND

Antennas intended to communicate with satellites in the microwave and millimeter-wave (mmWave) VSAT frequency bands roughly from roughly 6 up to 100 GHz typically take the form of either an electrically-steered phased array, or a mechanically gimballed or steered parabolic reflector antenna. Electrically-steered phased arrays are low-profile and can scan one or more high-gain beams independently across the field of view and therefore allow for multiple simultaneous satellite links to be held and tracked over time, but will typically require very high cost and power consumption from the large number of circuits required to construct the array. Mechanically-steered antennas, which includes reflector antennas as well as gimballed flat-panel array antennas, are physically limited to a single beam per aperture, but can offer reduced component count and power consumption. There are hybrid approaches, where a single axis of electrical beamforming is combined with a single axis of mechanical steering to reduce the circuit count and therefore cost while keeping a low physical profile, but these hybrids have inherited the restrictions of the mechanically actuated products, in that only a single antenna beam can be formed.

For satellite communications, a feasible terminal must be capable of communicating with multiple completely independent satellites to be considered a true multi-beam antenna. Different satellites can be in different orbits, with different orbital periods, and travelling in different directions relative to the antenna or terminal, which means that any fixed separation or restriction between the pointing angles of different beams does not allow for proper operation as a multibeam SATCOM antenna. The need for multiple links is accentuated as new LEO (Low Earth Orbit), MEO (Medium Earth Orbit), and other NGSO (Non-Geostationary Orbit) satellite constellations enter the market. These networks have many satellites overhead and require rapid handover for which mechanically controlled single-beam systems are not fast enough to function. Connecting simultaneously to two satellites for a make-before-break handover becomes highly beneficial for a ground terminal. In addition to multiple handovers, multiple beams allows multiple links to different satellites and/or networks for multiplying traffic and throughput or leveraging benefits of one network over another for different classes of traffic. Achieving multi-satellite connectivity from small antennas suitable for use on a mobility platform is a key requirement to make use of the new satellite capacity being launched.

BRIEF SUMMARY OF THE DISCLOSURE

An antenna integrated into a SATCOM terminal that is constructed using a phased array of lens antenna elements as described in U.S. Pat. No. 10,116,051, "Lens antenna system", granted Oct. 10, 2019, and incorporating the restricted number of feeds from a circle covering a circular focal region to a line of feeds underneath each lens and rotating the entire array as described in U.S. Patent Application Publication No. 2020/0350681A1, "Gain roll-off for hybrid mechanical-lens antenna phased arrays", filed May 1, 2020 to support scanning a single beam electromechanically across the upper hemisphere. The restriction to a single beam limits the applications of this previously described technology, however. Multiple independently-pointed simultaneous beams (where each beam consists of an Rx & Tx pair) are desirable for the purposes of maintaining multiple simultaneous communication links, maintaining an active primary link while a secondary link is maintained at standby for failover or other purposes, or maintaining an active link during a handover of data between two endpoints, such as from a setting to a rising satellite.

The previously described antenna is extended according to this disclosure through the addition of a mechanical actuator to move the lenses relative to the feeds in a direction perpendicular to the line of feeds. In this way, the shape of the focal region addressed by the feeds underneath each lens in the array, and therefore the available electronic scanning volume accessible to be used as element patterns of the lens array, changes from a single cut to instead take on a family of curved regions across the upper hemisphere. This addition allows two fully independent beams to be steered anywhere in the field of view of the lens array by, in effect, mapping both desired beam locations to a pair of points on the focal plane of the lens antenna array elements, and then rotating the array as a whole and shifting the lenses relative to the feeds such that both points on the focal plane are covered by the feed array. In this way, any two beams may be formed.

This implementation can be further extended to produce a multi-band array implementation. Since only a single line of feeds is used to support forming any two beams throughout the field of view of the antenna, and the single line of feeds occupies only a subset of the area underneath each lens, an additional line of feeds tuned for a different frequency can be added next to the first line of feeds within the focal region of a dual-, multi-, or broad-band RF (Radio Frequency) lens, such that both lines of feeds are parallel and immediately adjacent. Either row of feeds may be used by shifting the lenses relative to the feeds to allow one or two beams to be formed at the first frequency, or one or two beams to be formed at the second frequency, or choosing to form one beam at each of the first and second frequencies. Some benefits of one or more aspects of this disclosure are reduced cost, power consumption, and circuit count due to the use of the lens array technology and due to reducing the number of feeds from covering a full focal region underneath each lens to only covering a line underneath each lens, while maintaining the inherent multibeam capability of the lens array technology.

Viewed from a first aspect, there is provided a multi-beam electromechanically actuated lens antenna, comprising:

a) an RF lens having one or more focal locus;

b) one or more feed modules having a region of feeds, the region of feeds covering a subset of the one or more focal locus of the lens;

c) a first actuator configured to rotate the lens and the one or more feed module together to scan in at least one direction;

d) a second actuator configured to offset the lens from the region of feeds along one of the one or more focal locus of the lens; and e) a plurality of focal points on the one or more focal locus, wherein the first actuator or the second actuator or both the first actuator and the second actuator is configured to position the region of feeds relative to the RF lens so as to enable a beam to be generated at each of two or more of the plurality of focal points on the one or more focal locus.

In this way, it is possible for any two of the plurality of focal points on the one or more focal locus to be addressed, each of the focal points producing a beam.

The region of feeds may be conformal to the subset of the one of more focal locus of the lens.

The first actuator may be configured to rotate the lens and the one or more feed module together to scan in azimuth. Other scan directions, such as elevation, may alternatively or additionally be implemented.

The region of feeds may comprise one or more rows of feeds.

The one or more rows of feeds may be offset to minimize the maximum distance of the focal point from the closest feed within the regions of feeds.

One or more of the feed modules may provide only transmit functionality and one or more of the feed modules may provide only receive functionality.

Alternatively, each of the one or more feed modules may provide full-duplex transmit and receive functionality.

Alternatively, each of the one or more feed modules may provide half-duplex transmit and receive functionality.

In some embodiments, any two of the plurality of focal points of the RF lens can be selected simultaneously.

The region of feeds may be substantially linear.

The second actuator may be configured to offset the lens from the region of feeds along one of the one or more focal locus of the lens in a direction perpendicular to the line of feeds.

Viewed from a second aspect, there is provided a multi-beam multi-band electromechanically actuated lens antenna, comprising:

a) an RF lens having one or more focal locus;

b) one or more feed modules having a plurality of regions of feeds, each of the plurality of regions of feeds covering a different subset of the one or more focal locus of the lens;

c) each of the plurality of regions of feeds operates in a different frequency band;

d) a first actuator configured to rotate the lens and the one or more feed module together to scan in at least one direction;

e) a second actuator configured to offset the lens from the plurality of regions of feeds along one of the one or more focal locus of the lens; and f) a plurality of focal points on the one or more focal locus, wherein the first actuator or the second actuator or both the first actuator and the second actuator is configured to position the region of feeds relative to the RF lens so as to enable an independent beam to be generated at each of two or more of the plurality of focal points on the one or more focal locus, each beam being a dual band beam.

In this way, it is possible for any two of the plurality of focal points on the one or more focal locus to be addressed, each of the focal points producing two independent beams with any combination of the one or more focal locus. The beams in this embodiment are dual band.

Each of the regions of feeds may be conformal to the respective subset of the one of more focal locus of the lens.

The first actuator may be configured to rotate the lens and the one or more feed module together to scan in azimuth. Other scan directions, such as elevation, may alternatively or additionally be implemented.

A first region of feeds may cover Ka-band and a second region of feeds may cover Ku-band.

A first region of feeds may cover Ka-band and a second region of feeds may cover X-band.

A first region of feeds may cover Ku-band and a second region of feeds may cover X-band.

A first region of feeds may cover Ka-band and a second region of feeds may cover V-band.

The one or more focal locus may be planar in both the first and second aspects.

The one or more focal locus may be non-planar in both the first and second aspects.

The plurality of regions of feeds may be substantially linear.

The plurality of regions of feeds may be substantially parallel.

Viewed from a third aspect, there is provided a multi-beam electromechanically actuated lens array antenna, comprising:

a) a plurality of RF lenses forming an array, the plurality of RF lenses having one or more lens focal locus;

b) each RF lens of the plurality of RF lenses in the array is associated with one or more of the same feed modules having one or more regions of feeds covering one or more subsets of the one or more lens focal locus;

c) the one or more feed modules oriented and located substantially across the array relative to the plurality of RF lenses;

d) a first actuator configured to rotate the plurality of RF lenses and the region of feeds together to scan in at least one direction; and e) a second actuator configured to offset jointly the plurality of RF lenses from the respective one or more regions of feeds associated with each RF lens along the one or more lens focal locus.

Each of the one or more regions of feeds may be conformal to the respective subset of the one of more focal locus of the lens.

The first actuator may be configured to rotate the plurality of RF lenses and the region of feeds together to scan in azimuth. Other scan directions, such as elevation, may alternatively or additionally be implemented.

Each of the one or more regions of feeds of the one or more feed modules across the array of RF lenses may operate in a different frequency band.

The location of the one or more feed modules relative to their respective RF lens may be offset from the location of the one or more feed modules relative to a separate RF lens across the plurality of RF lenses to reduce scan ripple and gaps in coverage.

The antenna may be configured so that heat is conducted from the one or more feed modules through a liquid cooling loop using a rotary cable tray, the heat to be dissipated in a heat sink.

The antenna may be configured so that heat is conducted from the one or more feed modules through an air bearing, the heat to be dissipated in a heat sink.

The antenna may be configured so that heat is conducted from the one or more feed modules through a thin polymer bearing, the heat to be dissipated in a heat sink.

The electromechanical multibeam lens array antenna can be applied for SATCOM communications to enable multiple links to different satellites in different orbits and even in different frequency bands at a greatly reduced cost, power consumption, and complexity compared to a multibeam phased array, especially a multi-band multibeam phased array that uses multi-band antenna elements.

BRIEF DESCRIPTION OF THE DRAWINGS

Embodiments of the disclosure are further described hereinafter with reference to the accompanying drawings, in which:

FIG. 2(*b*) illustrates an example transmit-only lens module and feeds that can be utilized in accordance with various embodiments.

FIG. 2(*c*) illustrates an example switched half-duplex lens module and feeds that can be utilized in accordance with various embodiments.

FIG. 2(*d*) illustrates an example full-duplex lens module and feeds with diplexer that can be utilized in accordance with various embodiments.

FIG. 3(*b*) illustrates an example of the angular field of view accessible to the arrangement of feeds in FIG. 3(*a*).

FIG. 3(*c*) illustrates an example half-line arrangement of feeds underneath a lens antenna from the prior art.

FIG. 3(*d*) illustrates an example of the angular field of view accessible to the arrangement of feeds in FIG. 3(*c*).

FIG. 3(*e*) illustrates an example linear arrangement of feeds underneath a lens antenna from the prior art.

FIG. 3(*f*) illustrates an example of the angular field of view accessible to the arrangement of feeds in FIG. 3(*e*).

FIG. 3(*g*) illustrates an example sliding linear arrangement of feeds underneath a lens antenna that can be utilized in accordance with various embodiments.

FIG. 3(*h*) illustrates an example of the angular field of view accessible to the arrangement of feeds in FIG. 3(*g*) that can be utilized in accordance with various embodiments.

FIG. 3(*i*) illustrates an example sliding arrangement of two rows of feeds underneath a lens antenna that can be utilized in accordance with various embodiments.

FIG. 3(*j*) illustrates an example of the angular field of view accessible to the arrangement of feeds in FIG. 3(*i*) that can be utilized in accordance with various embodiments.

FIG. 3(*k*) illustrates an example arrangement of feeds at two frequencies underneath a lens antenna that can be utilized in accordance with various embodiments.

FIG. 3(*l*) illustrates an example of the angular field of view accessible to the arrangement of feeds in FIG. 3(*k*) that can be utilized in accordance with various embodiments.

FIG. 4(*b*) illustrates an example single lens of a single-band multibeam hybrid antenna where the lens and feeds rotate together, and the lens moves in one axis relative to the housing and the fixed line of feeds that can be utilized in accordance with various embodiments.

FIG. 4(*c*) illustrates an example single lens of a dual-band multibeam hybrid antenna where the lens and feeds rotate together, and the lens moves in one axis relative to the housing and the two fixed lines of feeds for the different frequencies that can be utilized in accordance with various embodiments.

FIG. 5(*b*) illustrates an example small array of three lenses where the feeds are offset relative to the lenses by different amounts across the array that can be utilized in accordance with various embodiments.

FIG. 5(*c*) illustrates an example of the corresponding array envelope for an array without offsets that can be utilized in accordance with various embodiments.

FIG. 5(*d*) illustrates an example of the corresponding array envelope for an array with offsets that can be utilized in accordance with various embodiments.

FIG. 6(*b*) illustrates an example the different angular fields of view accessible to the arrangement and specified movement of feeds in FIG. 6(*a*) that can be utilized in accordance with various embodiments.

FIG. 6(*c*) illustrates an example arrangement of feeds and their specified motion underneath a lens antenna that can be utilized in accordance with various embodiments.

FIG. 6(*d*) illustrates an example of the different angular fields of view accessible to the arrangement and specified movement of feeds in FIG. 6(*c*) that can be utilized in accordance with various embodiments.

FIG. 6(*e*) illustrates an example arrangement of feeds after having been rotated underneath a lens antenna that can be utilized in accordance with various embodiments.

FIG. 6(*f*) illustrates an example of the different angular fields of view accessible to the arrangement and specified movement of feeds in FIG. 6(*c*) that can be utilized in accordance with various embodiments.

FIG. 7(*b*) illustrates an example configuration of rotation and lateral shift of feeds relative to the lenses in an array of lenses to form a hybrid electromechanical beamforming antenna for a SATCOM terminal that can be utilized in accordance with various embodiments.

FIG. 7(*c*) illustrates an example configuration of rotation and lateral shift of feeds relative to the lenses in an array of lenses to form a hybrid electromechanical beamforming antenna for a SATCOM terminal that can be utilized in accordance with various embodiments.

FIG. 8(*b*) illustrates an example feed board underneath the lenses that can be utilized in accordance with various embodiments.

FIG. 8(*c*) illustrates a cross-section of an example antenna that can be utilized in accordance with various embodiments.

FIG. 8(*d*) illustrates a cross section of an example antenna including an implementation option for the rotation joints and actuators using a cable tray that can be utilized in accordance with various embodiments.

FIG. 8(*e*) illustrates a cross section of an example antenna including an implementation option for the rotation joints and actuators using an air bearing and slip ring that can be utilized in accordance with various embodiments.

FIG. 8(*f*) illustrates a cross section of an example antenna including an implementation option for the rotation joints and actuators using a polymer bearing and slip ring that can be utilized in accordance with various embodiments.

FIG. 9(*b*) illustrates an example of the angular field of view supported by the configuration of feeds in FIG. 9(*a*) that can be utilized in accordance with various embodiments.

DETAILED DESCRIPTION

Figure 1:
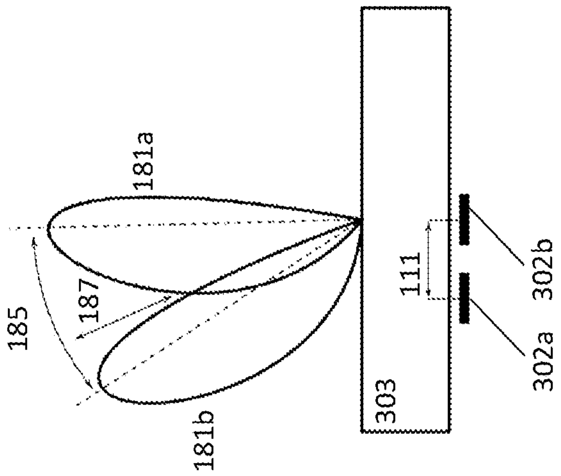
FIG. 1 illustrates an example of the selection of a feed-feed spacing based on the acceptable roll-off between beams from adjacent feeds that can be utilized in accordance with various embodiments.

The accompanying drawings are incorporated in and constitute a part of this specification. It is to be understood that the drawings illustrate only some examples of the disclosure and other examples or combinations of various examples that are not specifically illustrated in the drawings may still fall within the scope of this disclosure. Examples will now be described with additional detail through the use of the drawings, in which:

An implementation of this disclosure consists of an array of lens antennas, where the lens antennas are composed of an RF or microwave lens and associated plurality of feeds as described in U.S. Pat. No. 10,116,051 which is hereby incorporated by reference herein in its entirety. The feeds are each associated with control, selection, amplifier, and beamforming circuits to determine which feeds are used and to set the relative magnitude and phase of each element so as to steer one or more beams in desired directions, as described in U.S. Pat. No. 10,116,051 and G.B. Patent Application No. 2113903.5, "Multi-beam antenna array", filed Sep. 29, 2021, both are which are hereby incorporated by reference herein in their entireties. In particular for this disclosure, the plurality of feeds arranged on the focal plane (locus) of each lens is restricted to cover a line only rather than the full circle of the focal region, and are then allowed to slide relative to the center of the lens focal locus. The line nominally through the center of the focal locus of the lens before the shift occurs may be covered by a single (see FIG. 3(*g*)) or doubled row (see FIG. 3(*i*)) of feeds. A single row of feeds minimizes the PCB (Printed Circuit Board) area and circuit expense, but a doubled row of feeds covering the linear selected focal region improves the performance by allowing more control over the beam properties as described in G.B. Patent Application No. 2113903.5 by allowing up to four feeds to contribute to a beam with projected focal point in between the set of four feed elements. The spacing between the feeds is selected along with the properties of the lenses to allow smooth electrical scanning between angles within the supported focal region, while allowing for acceptable feed-feed spacing to allow for good antenna performance, as illustrated in FIG. 1.

FIG. 1 illustrates the selection criteria for the spacing between feeds on the focal plane or focal locus of the lens 303. For two feeds 302 (*a*) and 302 (*b*) that are separated by a distance 111, if each is enabled separately the feeds will produce corresponding radiation patterns 181 (*a*) and 181 (*b*). The angular separation 185 and beamwidth of the two beams 181 (*a,b*) at the highest frequency of operation, which are both defined by the focusing and beam steering properties of the RF lens antenna 303, will then result in a measured crossover point between the beams at a power roll-off 187. This crossover point defined by the power roll-off 187 determines the smoothness of the beam scanning from feed to feed behind the lens antenna. If the beam-beam roll-off is large (greater than 3 dB) then there will be a large ripple in the array steering pattern if nothing is done to compensate. However, if the beam-beam roll-off 187 is small (between 0.5 to 2.5 dB), then the ripple between beams and therefore in the array-level scan pattern will be small. The scale of the roll-off is controlled by the spacing 111 between feeds, which can be set as a trade-off between acceptable feed-feed beam roll-off 187, the amount of PCB area required to fit the circuitry corresponding to a single feed, the number of circuits and the cost of the circuits. A good trade-off often works out to around half a wavelength at the highest frequency of operation, or within the range of approximately 0.25 to 0.75 wavelengths. The feed spacings in all of the configurations receive-only 201, transmit-only 221, half-duplex 241, and full-duplex 261 are subject to the same constraints when picking the feed-feed spacing 111. However, since the highest frequency of operation determines the required feed-feed spacing, and the transmit frequencies for VSAT user ground terminals are always higher than the receive frequencies, a transmit lens or half- or full-duplex lens will require a closer physical spacing than the receive-only lens. The additional circuitry required in the half- and full-duplex options may impose a constraint for wider feed spacing than for the transmit-only case, even though they have the same maximum frequency since both serve the VSAT transmit frequencies.

Figure 2:
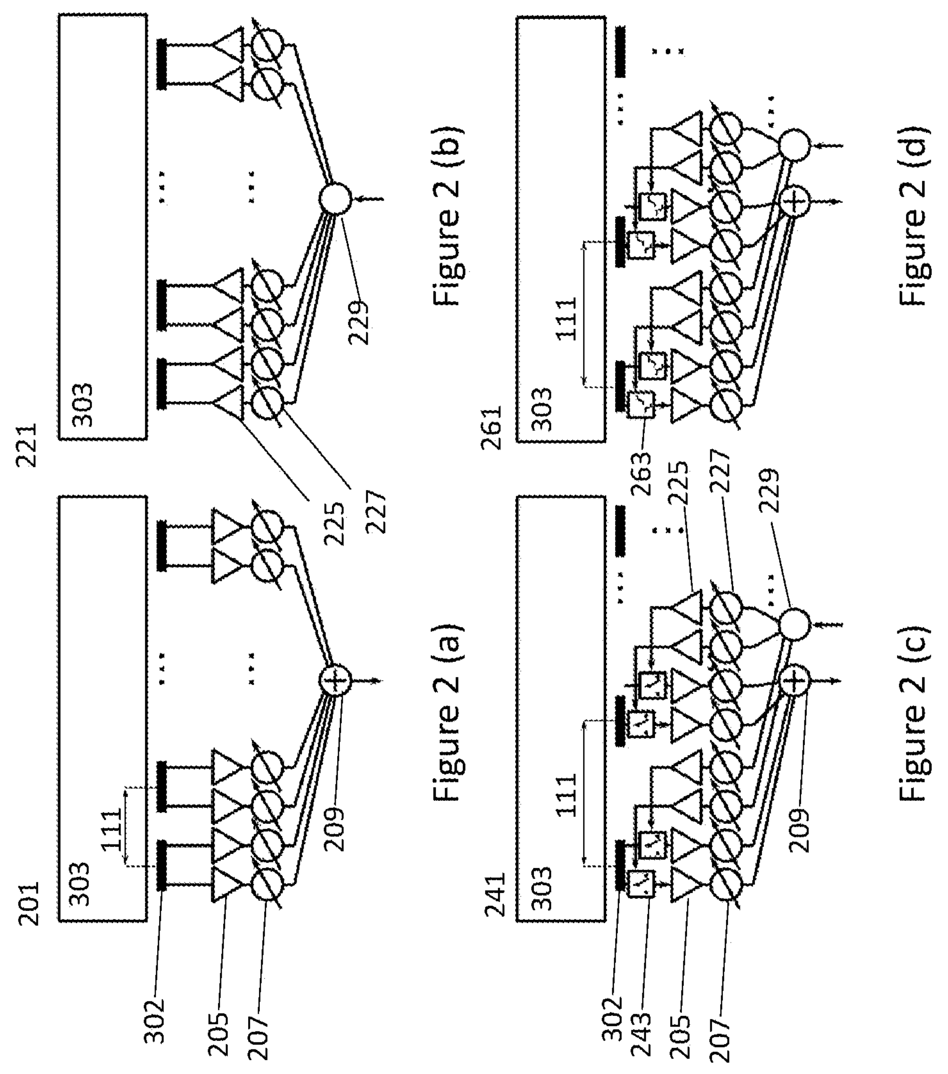
FIG. 2(*a*) illustrates an example receive-only lens module and feeds that can be utilized in accordance with various embodiments.

The lens antenna modules are each composed of the RF lens 303 and its associated linear collection of feeds 302. The lens antenna modules that form the array elements of the overall array antenna can be implemented either as separate receive lens modules 201 and transmit lens modules 221, as combined full-duplex receive and transmit lens modules 241, or as combined half-duplex receive and transmit lens modules 261, as illustrated in FIG. 2(*a-d*). Each case includes two front-end RF processing chains for each feed to allow for dual-polarization support consisting of amplifiers, Low Noise Amplifier (LNA) 205 for receive and HPA (High-Power Amplifier) 225, and phase shifters 207, 227. All of the signals are summed 209 or split 229 at an individual lens module level before being connecting to the rest of the system. Switches 243 or diplexers 263 can be used to connect a single patch into both transmit and receive chains in the half-duplex switched or full-duplex combined Rx & Tx options 241 and 261.

FIG. 2(*a*) shows an embodiment of a receive-only lens module 201 for use in a lens array, where the lens 303 is directly adjacent to the plurality of feeds 302 and each of the two polarization ports of each feed is connected to a receive low-noise amplifier (LNA) 205 and phase/magnitude shifter 207, which is capable of completing disabling the signal from a given feed. The signals from the feeds are summed 209 to produce the signal from a single lens for a single beam. The amplifier 205, phase/magnitude shifter 207, and summation 209 functionalities can be performed on a combined beamformer IC (Integrated Circuit), where the circuitry for a plurality of feeds and polarizations is combined into one chip. For example, the requisite amplifier 205, and phase/magnitude shifter 207 for a single polarization may be combined into a single IC and one IC added to the PCB for each polarization port of each feed, or a set of eight amplifiers 205, shifters 207, and a corresponding summation unit 209 may be combined so as to serve the two polarizations from each of four feeds. More or fewer channels per IC may be used. When this is done, the summation operation 209 is performed at multiple stages, with initial summation performed within the beamformer IC, and the remaining summation of the remaining feeds and ports of the lens performed in an additional analog signal combiner or summation circuit. In addition, some of the beamformer circuitry for each of the plurality of feeds and their associated polarization ports including the phase/magnitude shifters 207 and summation 209 can be duplicated in the same or discrete ICs to allow different or the same subsets of feeds and polarizations to be processed differently so as to produce multiple beams. In addition, although the diagram is drawn indicating analog signal processing, the same process of phase/magnitude shifting and signal summation may be performed in the digital domain using digital signal processing at any point in the system.

FIG. 2(*b*) shows a corresponding embodiment of a transmit-only lens module 221 for use in a lens array. Here, an HPA (high-power amplifier) or SSPA (solid state power amplifier) 225, phase/magnitude shifter 227, and signal divider or splitter 229 are used in an analogous way to the receive case illustrated previously. The same implementation options as described previously for combining multiple channels of processing into a beamformer IC, splitting at multiple stages, duplicating the splitter and shifter functionality so as to support multiple beams, and option for digital beamforming implementations all apply to transmit as well as receive.

FIG. 2(*c*) shows an embodiment of a combined transmit and receive lens module 241 that functions in a switched half-duplex mode. This implementation combines the circuitry 205, 207, 209, 225, 227, 229 from 201 and 221 for each feed along with a transmit/receive switch 243 to allow the operational mode (transmit or receive) of the lens module and/or each feed to be selected. In half-duplex mode, the lens module may operate in either transmit or receive mode at once, but not both, in order to prevent self-interference from the transmitting feed elements to the receive feed elements under the same lens. If sufficient RF signal filtering is implemented to prevent the LNA 205 from being saturated by the signal from an adjacent transmit amplifier 225, then the lens may be able to be operated such that each feed or each beam within the same lens may be transmit or receive at the same time.

FIG. 2(*d*) shows an embodiment of a combined transmit and receive lens module 261 that functions in a full-duplex mode, allowing every feed in the lens to both transmit and receive at the same time by changing the switch 243 for a diplexer filter 263 that provides sufficient isolation between receive and transmit to allow the receiver to continue to operate without self-interference while transmitting. The full duplex implementation increases overall effective aperture efficiency of the resulting lens array since the physical aperture is larger. However, the losses incurred in the diplexer will impact the receive and transmit signals, so that the performance of the full duplex option is not double of the performance of the half-duplex or receive/transmit only implementations.

The benefits of separate receive and transmit lens modules are that the RF lens and feeds can be completely optimized for the specific transmit and receive purposes. For typical VSAT SATCOM applications that use FDMA (frequency division multiple access) with a higher transmit than receive frequency, the optimal number of feeds, size of the feeds, and spacing of the feeds is different for the receive and transmit bands, so better performance or lower costs could be achieved by using a different design. For example, a Ka-band SATCOM terminal would be designed with an approximately half-wavelength spacing of feeds for the user terminal receive frequency (forward link) of 20 GHz (or from about 17 to 22 GHz) to be approximately 7.5 mm, while the half-wavelength spacing of feeds for the user terminal transmit frequency (return link) of 30 GHz (or from 27 to 31 GHz) to be approximately 5 mm, with the number of feeds in each band selected to fill the full focal region of the RF lenses. In this way, for an RF lens with planar, circular base of 6 cm diameter with a 4 cm circular focal plane to cover the full field of view of approximately +/−60 to 90 degrees, the receive lens module could choose 4 cm/7.5 mm=6 feeds×2 feeds as the linear focal region, while the transmit lens module could choose 4 cm/5 mm=8 feeds×2 feeds as the linear focal region. In some cases, denser or sparser feed placement may be preferred. Alternate frequencies and lens dimensions are also possible. For example, lens diameters may be selected in the range from approximately 1 to 40 cm based on the frequency and physical requirements of the terminal for frequencies from approximately 1 GHz up to 100 GHz. In each of these cases, the number of feeds would be selected independently, as described above. In addition to the frequency-based optimization of the lens module elements, a separate lens module design enables better filtering and therefore reduced co-site interference from the transmitted to the received signals, as well as the increased isolation due to spatial separation between receive and transmit apertures. However, using different feed layouts and lens designs across different subsets of the lens array could result in mismatch of pointing angles or calibration coefficients between bands which would be simplified by using a single set of feeds or a single lens design.

An alternate implementation using the same lens module, either half-duplex (241 in FIG. 2(*c*)) or full-duplex (261 in FIG. 2(*d*)), to support both receive and transmit functionality has benefits. Only a single lens design 303 must be performed, which saves design effort and fabrication setup costs compared to production of multiple distinct lens designs, and also ensures that the pointing angle to focal plane location mapping for both bands is the same, since it is the same lens design. However, isolation between the bands as well as fitting both transmit and receive circuitry into a limited amount of PCB area is a challenge that is particularly difficult for higher frequencies. The half-duplex option 241 is beneficial due to the reduced filtering requirements to achieve a given receive to transmit isolation level, since a given lens or the entire array can be set to either transmit or receive in that case. Additional filtering 263 for full-duplex 261 or switching 243 for half-duplex 241 implementations implies additional losses in front of the receive and transmit amplifiers 205 and 225, which degrades the achievable performance. The radiation patterns and performance are improved, though, since the entire aperture can be used for both transmit and receive functions, rather than requiring to split the aperture. Specific details of the feed spacing, integrated circuit dimensions and pinout, transmit to receive isolation requirements, and/or PCB properties will determine whether lens modules with combined or independent receive and transmit functionality are used in a given case.

The best implementation for Ka-band operation is to use separate lens modules for transmit and receive, since the smallest available RF beamforming ICs covering four feeds in the latest RF IC processes are on the order of 4-8 mm square, which limits the use of separate receive and transmit circuits along with the associated support circuits, filters and/or diplexers in the space available behind the feeds on a single planar PCB. In contrast, the most optimal implementation for Ku-band operation would be to combine receive and transmit in either full-duplex or half-duplex mode to maximize the antenna area, since the feed dimensions for Ku are much larger than the feed dimensions for Ka, and allow the 4-8 mm square ICs to tile on a periodic hexagonal or rectangular feed grid in a way that is not possible for the smaller-wavelength Ka. Note that as RF beamforming ICs decrease in size with improvement in RF integrated circuit technology, it may become preferable to combine Rx & Tx functionality onto the same chip and same lens, or keep in separate chips and still place on the same lens, as an overall cost and complexity trade for the product.

Figure 3:
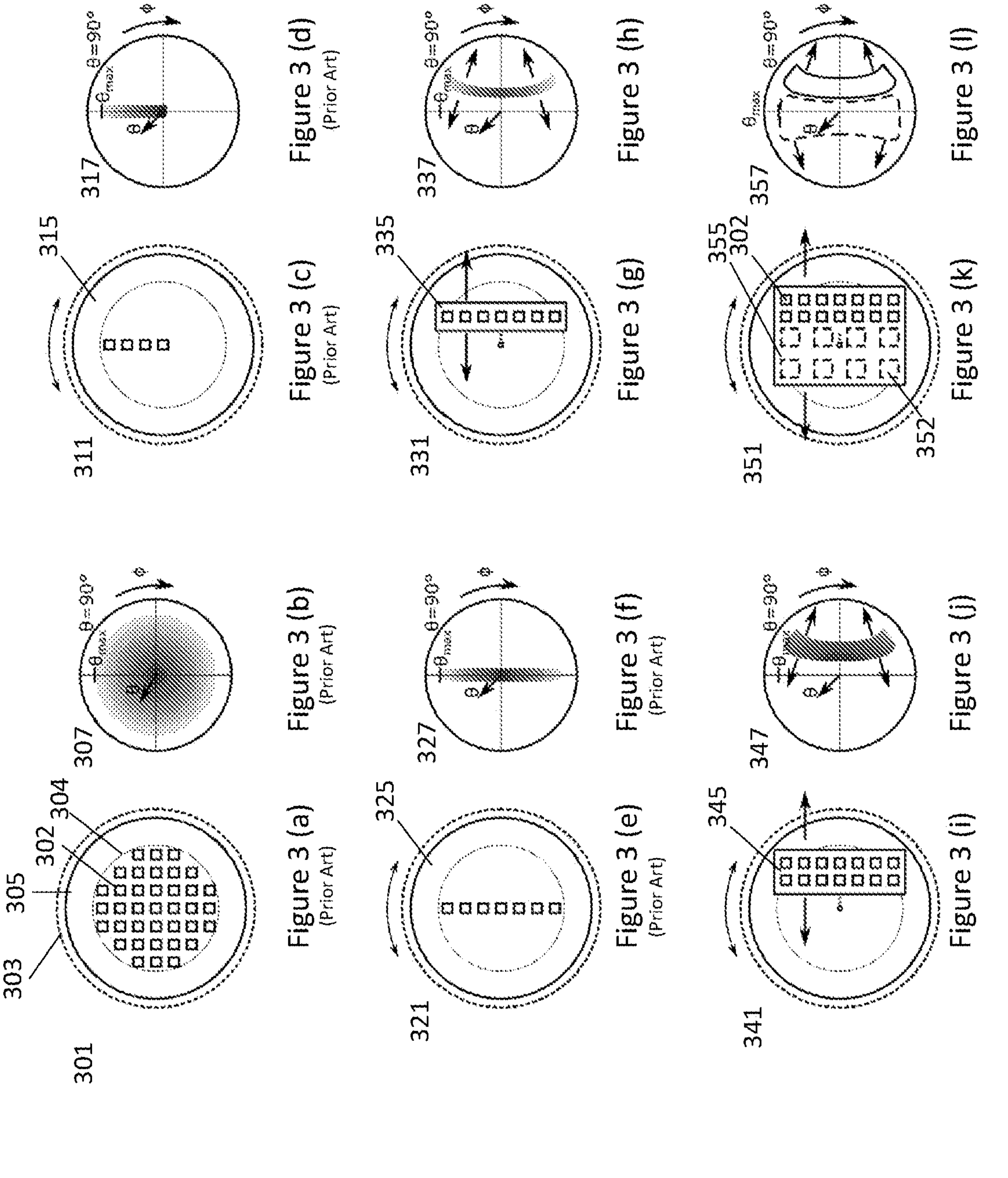
Figure 3 (a) (Prior Art)
Figure 3 (b) (Prior Art)
Figure 3 (c) (Prior Art)
Figure 3 (d) (Prior Art)
Figure 3 (e) (Prior Art)
Figure 3 (f) (Prior Art)
FIG. 3(*a*) illustrates an example arrangement of feeds underneath a lens antenna from the prior art.
Figure 8:
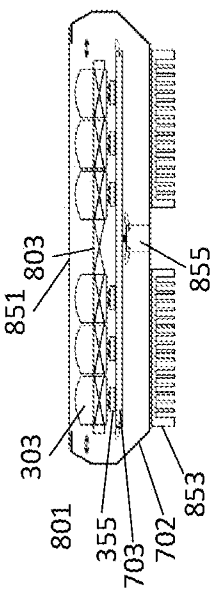
FIG. 8(*a*) illustrates an example of the lenses and lens mounting plate of a representative dual-band lens array where the lens plate carrying the lenses shifts laterally relative to the underlying feeds that can be utilized in accordance with various embodiments.
Figure 8:
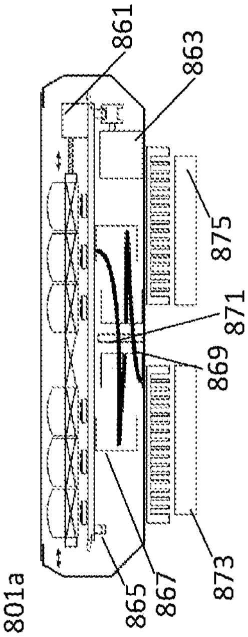
Figure 8:
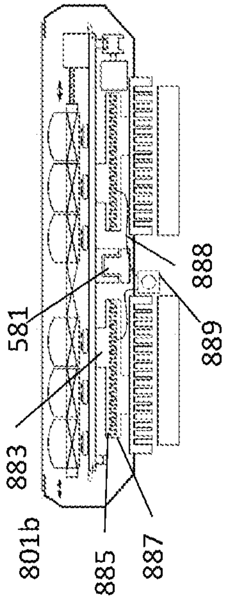
Figure 8:
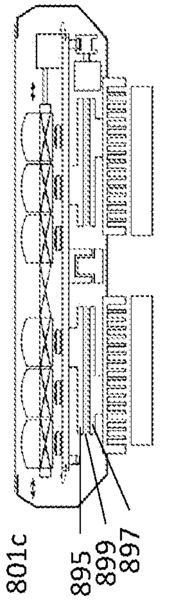
Figure 8:
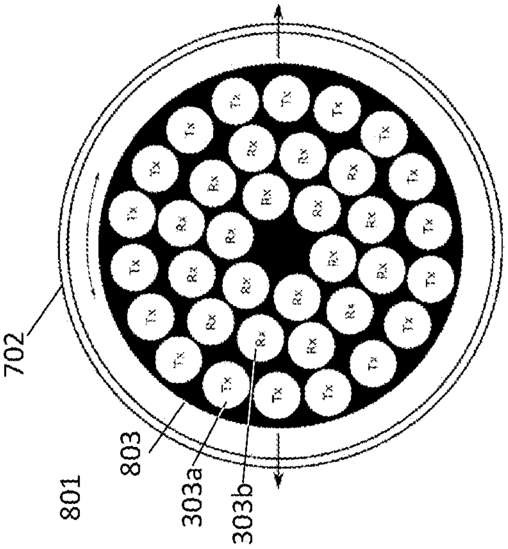
Figure 8:
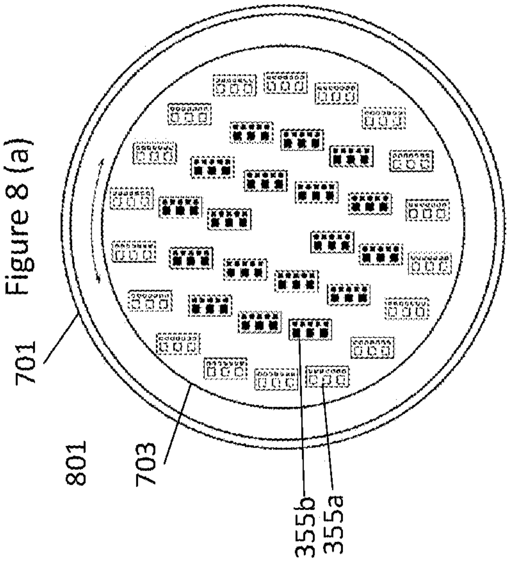

A multi-band implementation of a SATCOM terminal can be implemented in a straightforward fashion with this technology. As illustrated in FIG. 3(*k*), FIG. 8(*b*), and FIG. 9(*a*), multiple parallel linear feed regions, one for the first band and one for the second band, are placed side by side, such that either can be centered or placed arbitrarily at any position within the focal region by the linear shift of the lenses relative to the feeds. The lenses would be designed and tuned to operate across both bands, but the feeds would be optimized for the lens and the specific band of operation, and the front-end amplifiers and other RF circuits would be specific to each band, limiting the requirement to design and build dual-band amplifiers and beamformer circuits. The best approach for a Ku and Ka-band dual-band dual-beam antenna, as illustrated in FIG. 8(*b*), would be to construct an array from two sets of lens module designs; the first lens module design containing a first linear feed region composed of receive and transmit Ku-band feeds, and a second immediately adjacent and parallel linear feed region composed of receive Ka-band feeds. The second lens module design would contain a first linear feed region composed of receive and transmit Ku-band feeds, and a second immediately adjacent and parallel linear feed region composed of transmit Ka-band feeds. Such a system would be capable of steering any two Ka-band beams, any two Ku-band beams, or one Ku-band feed and one Ka-band feed across the field of view. Although this example is shown specifically for a combination of Ku and Ka feeds and their associated beamformers, other frequency combinations could be implemented, such as X and Ku, X and Ka, Ka and V, etc.

The embodiment of the feeds underneath the lenses is described as a linear feed region, or as rows or lines of feeds. The described implementation does use straight lines as the simplest and most straightforward method. One or more aspects of the disclosure could also be implemented with curved "lines" or regions of feeds that take on other shapes (triangles, rectangles, circular or parabolic arcs, generic "curves"), or any other suitable arrangement of the feeds that still accomplish the same purpose. Any arrangement chosen should allow the feeds to cover and address only a subset of the overall focal locus and corresponding coverage region of the upper hemisphere or field of view of the antenna with one actuator that aligns the focal region with the desired beam scan angle azimuthally, before using an actuator to shift the feeds relative to the lens to enable a second beam at an arbitrary location relative to a first beam to be covered by the feed region.

FIG. 3(*a-l*) illustrate a top view of a set of lens module implementations each composed of a lens and a feed array (FIG. 3(*a, c, e, g, I, k*)) and the corresponding angular coverage subset of the overall field of view (FIG. 3(*b,d,f,h, j,l*)) supported by that feed configuration. FIG. 3(*a-b, c-d, e-f*) represent illustrations of the prior art for comparison, where FIG. 3(*g-h, i-j, k-l*) show the line of feeds sliding in addition to rotating.

FIG. 3(*a*) illustrates a lens antenna module 301 composed of a lens 303, and 2D array 305 of feeds 302 filling the lens focal region 304 mounted on a PCB that is suitable for scanning beams electronically over the entire field of view of the RF lens 303 itself. The corresponding coverage 307 illustrated in FIG. 3(*b*), where the dark region indicates the relative pattern gain envelope across the far-field field of view parameterized as scan angle from boresight (zenith) theta and azimuthal scan angle phi. The coverage 307 indicates that the pattern envelope of the lens antenna, which corresponds to the envelope of array gain when the lens is combined into an array, covers all azimuth (phi) angles and theta angles from 0 to theta_max. FIGS. 3(*a*) and 3(*b*) are prior art which correspond to the lens antenna described also in U.S. Pat. No. 10,116,051.

FIG. 3(*c*) and FIG. 3(*e*) show lens module configurations with single lines of feeds, where the entire modules 311 and 321 can rotate in azimuth (phi). The lens module 311 with a feed array 315 contains a line of feeds 302 reaching from the center to the edge of the focal region 304 of the lens 303. In comparison, the lens module 321 with feed array 325 has feeds 302 stretching from one extreme scanning angle to another. The corresponding coverage regions 317 and 327 in FIG. 1(*d,f*) show the coverage regions, with a narrow angular region of supported scan angles from the center stretching to the top for 317 and to both top and bottom for 327. The coverage regions 317, 327 rotate in phi as the lens modules 311, 321 also rotate in phi. FIG. 3(*c-f*) represent elements of prior art that correspond to configurations shown in the prior art as described in US Patent Application US20200350681A1.

The lens module 331 is an embodiment of the disclosure shown in FIG. 3(*g*) and introduces a novel difference from lens module 321, in that the feed array 335 is shown as being offset from the center of the focal region 304 and able to move left and right as depicted, while the entire module 331 is shown as still being able to rotate in azimuth (phi). The impact of this change (allowing the feed array 335 to move relative to the center of the lens 303 focal region 304) is seen in FIG. 3(*h*), where the coverage region 337 is still predominantly vertical, but scanned to the right and curved and shown to move to the left and right corresponding to left and right motions of the feed array. There is still a one-to-one mapping of scan angle to feed location, but the straight line of feed locations now maps to a curved locus of scan angles when projected to a planar representation of the theta-phi space, as seen in the coverage region 337. This change to the design increases the variety of beam patterns that are able to be formed by the electromechanical array. Where the examples from the prior art have the coverage region always being linear and passing through the antenna zenith or boresight angle, by sliding the feeds left and right the coverage region changes and takes on other locations and shapes. The curved behavior of the coverage region is a side-effect; what is important is that the coverage region of the described embodiment is not restricted to always pass through boresight. If the coverage region was restricted to always pass through boresight, it would prevent arbitrary beam tracking; as a specific example, two beams, both at a scan angle of approximately 60 degrees in theta and one at approximately +30 degrees and the other at −30 degrees in phi would not be able to be addressed without the shift of the coverage region as described here. The benefit of this change is that any two locations or points within the overall field of view of the lens or array (with a one-to-one mapping to the focal plane or locus of the lens) may be accessed by the linear feed array 335.

The lens module 341 shown in FIG. 3(*i*) is an alternate embodiment replaces the single row of feeds 335 by a double row of feeds 345 while still covering a linear feed region and allowing that feed region underneath the lens 303 to slide left and right. Compared to the coverage region 337 of the single row of feeds 335, the coverage region 347 in FIG. 3(*j*) corresponding to the double row of feeds 345 has a broader angular coverage and increased performance at increased theta angles. Using a double-row 345 yields more consistent scanning performance when scanning compared to the single row 335.

FIG. 3(*k*) shows a further modification result in a feed array 355 that uses two different feeds 302, 352 corresponding to two different frequency bands as two parallel lines of two rows of feeds. The coverage region 357 in FIG. 3(*l*) shows two boundaries, where the solid boundary corresponds to the higher-frequency smaller patches 302, and the dashed boundary corresponds to the larger lower-frequency patches 352. This arrangement of feeds 355 is representative of a simultaneous dual-band Ku+Ka lens array, where either the Ku or Ka or both feeds may be used to steer beams, and the lenses are shifted relative to the feed array and jointly rotated to scan beams within the field of view of the lenses.

Although the diagrams are drawn assuming that the lenses have a generally planar focal locus or region, such that a planar linear feed region consisting of one or more rows of feeds is sufficient with linear shifting only to cover the entire focal region, this concept has a corresponding implementation for a spherical focal locus, such as lenses similar to the Luneburg lens. In this case, rather than a planar row of feeds, the feeds would be required to be curved conformal to the surface of the focal locus, and rotated about the center of the lens rather than shifted along the surface of the lens in order to scan independent multiple beams from a single lens antenna without a full electronic focal plane array. However, the lenses with a planar focal locus or region are preferred because building feeds on a curved surface is more expensive, and rotation of feeds about the center of a lens is impractical to perform across a full array of lenses. In this case, each lens would require independent joints and actuating linkages, rather than the planar case where groups of feeds corresponding to different lenses, up to and including all of the feeds corresponding to all of the lenses in the array, can be mounted to a single rigid structure and moved together, as well as allowing the lenses to be moved rather than the feeds. This is a possible implementation, and the use of one or more parallel linear feed regions for one or more bands of operation with a Luneburg or similar lens with a spherical focal locus such that the feed rotates about one axis of the lens while the entire lens rotates would be a practical single-lens antenna, although less desirable again than an implementation leveraging a lens with a planar focal locus.

The requirement for the lenses to move relative to the linear feed region along an axis perpendicular to the line of feeds imposes design constraints on the RF lenses themselves, the mounting structure, the feeds, and the supporting structure for the feeds. The set of all of the RF lenses move relative to the set of all of the feeds for all of the lens modules, which requires then that all of the feeds for all of the lenses are logically mounted to the same rigid structure, although that rigid structure may itself be composed of multiple distinct PCBs. The array of lenses as a whole are combined or mounted together on a plate or in a frame to allow them to be mounted and slidably moved relative to the rigid feed structure.

Figure 4:
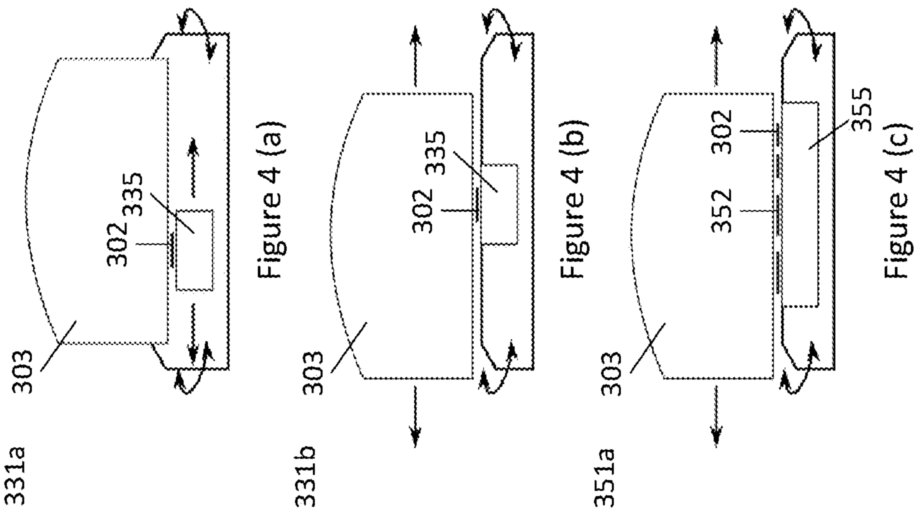
FIG. 4(*a*) illustrates an example single lens of a single-band multibeam hybrid antenna where the lens and feeds rotate together, and the line of feeds move in one axis relative to the housing and the fixed lens that can be utilized in accordance with various embodiments.

There are several implementation choices illustrated in FIG. 3(*g-l*), FIG. 4(*a-c*), FIG. 8(*a-f*) for where and how the lenses are slidably moved relative to the feeds for the multibeam electromechanical terminal. The fixed point of the terminal is the bottom housing, which also includes a thermal management system, data and power connectors, modems, mounting to the underlying platform, and other common equipment. The lenses and feeds together are then rotated relative to the base as a unit to steer beams in the azimuthal direction, as illustrated in FIG. 3(*g-l*), FIG. 8(*a-b*). There is then the option for the feeds to be fixed to the rotating base structure and have the lenses be moved relative to the base structure and feeds by an actuator as illustrated in FIG. 4(*b*), or for the lenses to be fixed to the rotating base structure and have the feeds slide relative to the lens and base structure as illustrated in FIG. 4(*a*), or to have neither lenses nor feeds fixed and allow both to slide relative to both each other and the base structure in opposite directions. There are advantages and disadvantages to each of these implementations.

FIG. 4(*a-c*) illustrate three methods of implementing any one of the lens modules 331, 341, 351, but illustrated only for the single row of feeds option 331.

FIG. 4(*a*) illustrates a side view of a lens module 331*a* where the feed array 335 moves left and right relative to a fixed lens, while the entire module still rotates.

FIG. 4(*b*) illustrates a side view of a lens module 331*b* where the feed array is fixed and centered relative to the module, and the lens moves left and right relative to the fixed feeds.

These two options for building a lens module 331*a*, 331*b* (sliding the feeds relative to the lens, or the lens relative to the feeds) imply differences in physical implementation, but are equivalent and interchangeable when describing or illustrating the operation of the terminal.

FIG. 4(*c*) illustrates a side view of a lens module 351*a*, which also has a feed array 355 that is fixed in position relative to the module, and slides the lens left and right.

An implementation with a fixed-feed structure as illustrated in FIG. 4(*b*) will have a simpler thermal path to conduct heat away from the feed electronics, but the actuator must be larger to move and control the larger mass of the lenses.

An alternate implementation with a fixed lens structure as illustrated in FIG. 4(*a*) will only require a smaller, lower-power actuator to move the lesser mass of the feed structures, but the additional thermal interface required by the moving feed structure will increase the thermal resistivity of the cooling path and reduce cooling efficiency. In addition, moving the feeds adds a second motion interface, as the moving feeds would be sandwiched between two stationary structures—the base and the lenses, as well as requiring cables for connecting power, digital control, and RF signals onto and off of the sliding interface, adding cost and reducing reliability. Both of these approaches will result in an unbalanced rotating structure as the center of mass of the lenses or the feeds is shifted away from the center/default location. A rotationally unbalanced system will cause challenges for the actuator, which then must be sized larger to account for driving an eccentric load.

Ensuring that the center of mass of the rotating structure remains unchanged could be done with a separately-moving counterweight in either the fixed-feed or fixed-lens configurations, or a modified design where both the feeds and lenses are actuated in different directions in a way so as to ensure that the center of mass remains on the axis of rotation. The configuration where both lenses and feeds move is the most mechanically complicated, but would ultimately require the smallest rotation actuators overall to ensure proper motion while the terminal is on-the-move.

The interface between the lenses and the feeds in this electromechanically-actuated terminal is more challenging than in a fixed array. The lenses must remain in close contact with the feeds, and any required gap between the lenses and feeds that may be required to avoid wear must be tightly controlled.

If a small air gap is introduced between the lenses and feeds, then the air gap must be tightly controlled (to within +/−0.2 to 0.02 mm) across the array, and must be maintained throughout the environmental, shock, and vibration conditions of operation. The air gap may be less than 0.5 mm, or may be as small as 0.1 mm or as large as 2 mm. The feeds and lenses must be specially designed and tuned to account for the air gap, where the conventional design instead requires a firm bonding of the lens to the feed to eliminate any air interface for optimal RF performance. The gap uniformity requirement is a very challenging parameter to meet across the array for a completely unsupported structure, requiring a very rigid frame within which the lenses must be mounted. The structural stiffness requirements can be reduced if the lens frame or plate is not mounted solely from the edges, but is also slidably supported by intermediate rails throughout the structure placed at strategic locations between lenses to set the appropriate height.

An alternate implementation to control the depth of the air gap or even eliminate the requirement for an air gap entirely is to introduce a thin, low-friction but RF-transparent material as a distributed linear bearing between the lenses and the feeds, such as a thin sheet of low-friction polymer. A single continuous sheet of polymer over the feeds or between the feeds with holes cut to allow the feeds to radiate through across the array would allow lenses above and feeds below to slide linearly relative to each other without wear. A preload force would be applied down from the lenses from the edges of the plate or frame as well as through mounting rails protruding between the lenses to ensure that the lenses remained in contact with the feeds through the polymer sheet throughout the operational conditions of the terminal, including environmental conditions and shock and vibration from on-the-move operation.

Figure 5:
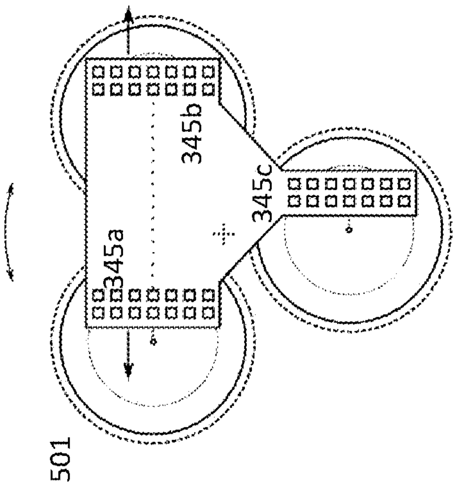
FIG. 5(*a*) illustrates an example small array of three lenses where the feeds are aligned with no offsets relative to the lenses across the array that can be utilized in accordance with various embodiments.
Figure 5:
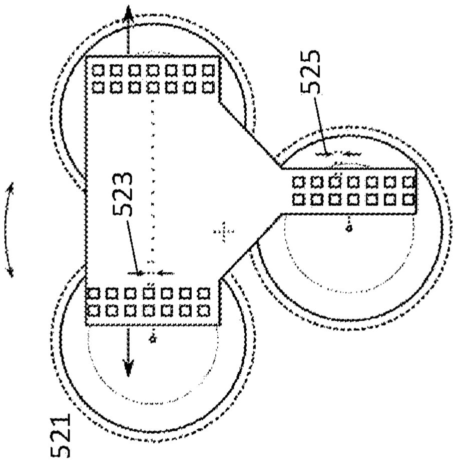
Figure 5:
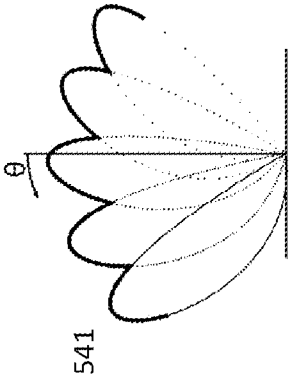
Figure 5:
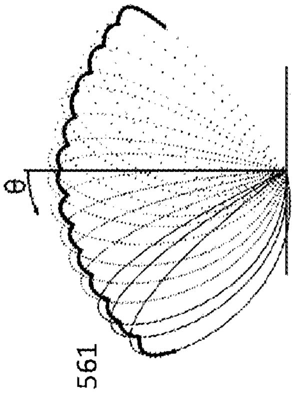

The locations of the feeds underneath each lens may be varied across the lens array, as illustrated for an example case in FIG. 5(*a-d*). If all feeds are exactly aligned identically relative to their respective lenses, then any variations in the element pattern due to the exact locations of the feeds relative to a desired beam location's focal point will be copied onto the overall array performance. For example, the element pattern from a lens antenna is different when the focal point beneath the lens for a given beam is directly located at the center of a feed, rather than located at a midpoint between two or four feeds. To alleviate this variation, the exact location of the feeds in the line of feeds can be physically offset slightly across the array to average and smooth out the effect element pattern response across the field of view. Here, an offset may be parallel or perpendicular to the linear feed region, but the most beneficial is substantially offset parallel. Because the feed array will always be controlled to be at the center of the line of feeds when aligned for the focal point of a desired beam, offsets are not necessary in the direction perpendicular to the line of feeds, only in the direction parallel with the line of feeds. For example, linearly shifting the location of the feeds under every other lens by half a period, or dividing the lenses into three groups and shifting the feeds of one third up, one third down, and leaving the remaining third in the nominal centered location, as is illustrated in FIG. 5(*b*). Random variations of offset with a uniform or normal distribution of offset distances of the feeds in a direction parallel to the linear feed region for each lens in the array would also yield a good performance, but would be more complicated to implement than a relatively small number of discrete offsets in a uniform pattern across the array. The simplest is to have two sets of feed arrangements to cover the linear focal region, where the feeds are staggered in their placement by half, so that no beam location across the field of view of the terminal is located in a worst-case location across all lenses simultaneously. Of course, additional steps or randomizations can be included as well to further improve uniformity of the array patterns and signal strength across the field of view of the terminal. This described linear offsetting is analogous in effect and purpose to the multiple rotation angles applied to the feed arrays as described in G.B. Patent Application No. 2113903.5.

FIG. 5(*a-d*) illustrates the effects of positional offsets between feeds underneath adjacent lenses. The effect is shown as between three lenses, but the principle remains true for larger arrays and additional dimensions as well.

FIG. 5(*a*) illustrates an array 501 formed of three lenses where the feed arrays 345 (a,b,c) are aligned in equivalent positions underneath each of their respective lenses. This array produces an array scanning envelope corresponding to the curve in FIG. 5(*c*). The five patterns shown scanning in the theta axis come from the feeds in the feed arrays. Since all of the feeds 345 (*a,b,c*) are aligned in the same relative vertical position relative to the lenses in 501, the roll-off from an individual lens is repeated at the array level, such that array beams pointed at a desired angle theta follow the bumpy or scalloped pattern in FIG.

In contrast, a modified placement of feeds is shown in FIG. 5(*b*) with small vertical offsets to break up the pattern from one lens across the entire array. Here, small vertical offsets 523 and 525 are included in the relative position of the feed arrays relative to their original position. These offsets have the effect of slightly scanning the radiation patterns or beams corresponding to the feeds from each lens, and therefore spreading out the patterns in angle across the array, as shown in FIG. 5(*d*). Here, although the envelope of array gains is lower than the peaks achieved from any one lens, the worst-case ripple and roll-off between beams in a single lens does not appear in the array-level envelope plot. Including a vertical offset or variation in feed position or spacing between lenses in the array in a distributed fashion thus yields an improvement in the average and worst-case array beam performance with respect to scan angle across the field of view.

The pointing of beams is controlled by software running on an embedded processor, microprocessor, microcontroller, or other computing device. Based on a user input applied through a user interface or through an interface to a modem or other network device, the satellite or satellites with which the terminal should be communicating are assigned. Based on the requested satellites and the readings from an internal GNSS (Global Navigation Satellite System) & IMU (Inertial Measurement Unit) sensor an integrated Antenna Control Unit (ACU) computes the expected direction from the current orientation and location on the earth of the terminal to the target satellite or satellites, and generates pointing commands to the terminal. The ACU will, over time, monitor the received signal from the satellite through the antenna and/or the modem to generate angular corrections to the expected locations of the satellites along with corrections applied during motion of the terminal from the IMU and GNSS.

Given the first pointing direction of a beam relative to the terminal, the terminal control software will identify the location on the focal plane underneath the lens, and compute a rotation angle and linear shift distance to align the center of the line of feeds at some point along its length with the desired focal point. In effect, the controller must find and define an equation of a line that passes through the beam focal point and describe that line in terms of the angle theta of the first actuator and linear offset r of the second actuator. For only a single active beam, there are two actuators, the equation of the line is overspecified, and so there are a continuum of possible angular and radial actuator settings that will allow the beam to be formed. This allows the controller to select a solution based on a minimum actuator motion, minimum eccentricity, or some other metric. As the beam smoothly moves due to satellite motion, then the smooth mapping of beam scanning angles to focal point location on the focal plane allows the controller to smoothly adjust the actuators to maintain the beam pointing angle. The satellite motion may be present during operation of a Non-Geo Stationary Orbit (NGSO) constellation such as Medium-Earth Orbit (MEO) or Low-Earth Orbit (LEO).

Given a second pointing direction, there are then two focal points projected by the controller to the focal plane of the lens elements. The controller then has to solve for the equation of the line that passes through both points in terms of the angle theta of the first actuator and the linear offset r of the second actuator. For two beams and a single linear feed region, the equation is well-defined with two variables and two constraints, so any two beam locations can be supported.

For a second pointing direction when two linear feed regions for different frequencies are in use, then the equation is more complicated. There are then two parallel lines of feeds, where each beam focal point is desired to be as close as possible to the centerline of each linear focal region. In this way, the controller solves for the angle theta and linear offset r that minimizes the distance from the center of each respective focal region to the two beam focal points a least-squares sense. If the two beams at different frequencies are too close (approximately <5 degrees) to each other or even collocated (pointing at the same satellite), then neither beam will be centered in their respective focal region and so the element patterns of the lenses will not be centered at the desired array scanning direction, which will result in a reduced array gain.

The mechanical motion of the feeds underneath the lenses only sets the element pattern of the lens array. Because the array factor is determined by the magnitude and phase and time offset applied to each of the lens elements within the array, there can be errors or offsets in the physical feed locations (on the order of approximately 0.1 to 2 mm) without the array-level beam pointing angle being affected. This allows the motion control system of the antenna to begin pointing beams as soon as the feeds are close enough to the targeted location and allows for looser tolerances in the mechanical positioning of the feed than would be required for a mechanically actuated reflector antenna, for example, which must be physically pointed to the same tolerances as the antenna beam requires, typically within approximately 0.1 or 0.2 degrees. This benefit of allowing a finite physical range of positioning errors without causing errors in the resulting pointing angles of the array is unique to the lens array technology in the space of mechanically-actuated antennas, and allows for reduced cost and mass actuators since high-frequency low-amplitude mechanical platform motion can be corrected by the electronic fine beam pointing while the low-frequency high-amplitude platform and satellite motion is addressed by the mechanical coarse feed positioning.

Figure 6:
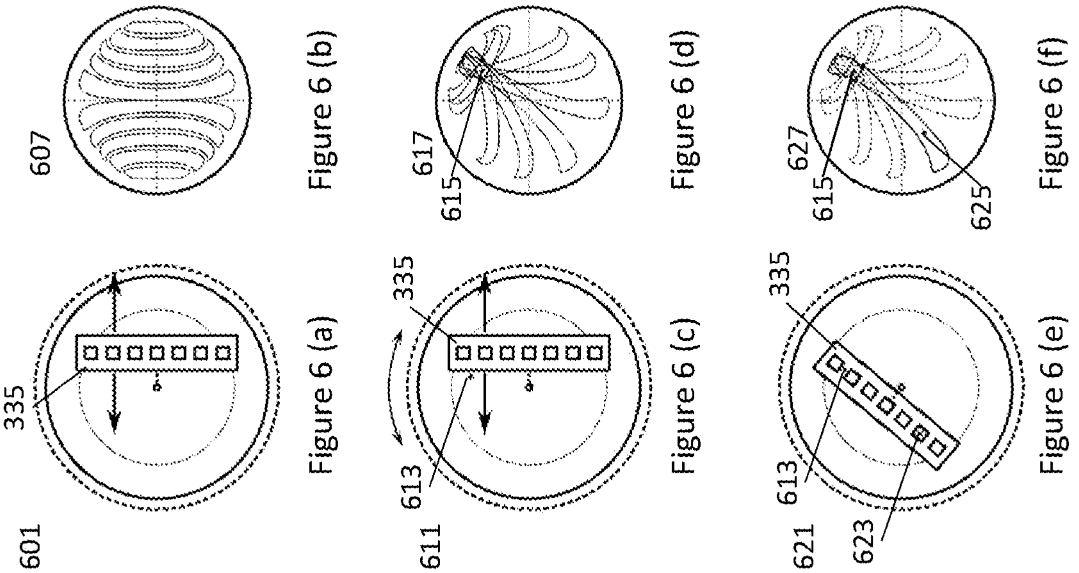
FIG. 6(*a*) illustrates an example arrangement of feeds and their specified motion underneath a lens antenna that can be utilized in accordance with various embodiments.

FIG. 6(*a-f*) jointly illustrate the method by which one or two beams may be formed by the electromechanical single-beam antenna in a way analogous as shown in FIG. 4(*a-c*) for a single lens module 601. FIG. 6(*a*) shows a starting orientation and position of the feed module 335 and shows the feed module 335 sliding left and right relative to the lens module 601. The corresponding coverage plot 607 in FIG. 6(*b*) shows a set of coverage contours corresponding to the different offset locations that can be taken by the feed module 335.

FIG. 6(*c*) shows a lens module 611 and adds a first desired beam location 613, and the lens module is shown as able to rotate as well as shift the feed. The coverage plot 617 in FIG. 6(*d*) shows the corresponding angular location 615 of a beam pointing in a desired direction in the upper hemisphere corresponding to the focal point 613 in FIG. 6(*c*). The set of coverage contours now correspond to a set of possible angle and offset settings for the feed array 335 relative to the lens. In effect, for every rotation angle theta that the array can take, there exists an offset distance r that can point a beam in a desired direction.

Finally, FIG. 6(*e*) shows a lens module 621 that has been rotated and shifted to align with both required focal points 613 and 623, corresponding to desired beam locations 615 and 625 in the coverage plot 627 in FIG. 6(*f*). The coverage plot 627 illustrates graphically that the controller chooses which of the rotation angle options from coverage plot 617 is aligned with the new second beam location 625.

Figure 7:
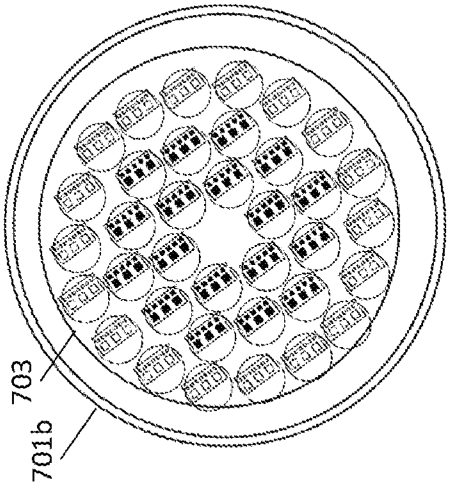
FIG. 7(*a*) illustrates an example configuration of rotation and lateral shift of feeds relative to the lenses in an array of lenses to form a hybrid electromechanical beamforming antenna for a SATCOM terminal that can be utilized in accordance with various embodiments.
Figure 7:
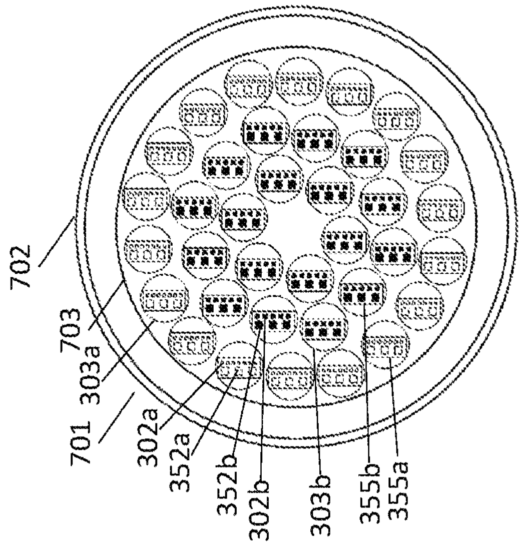
Figure 7:
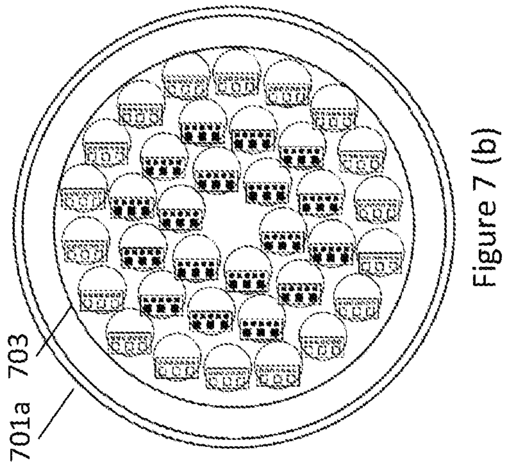

FIG. 7(*a*) shows an implementation of the electromechanical lens array antenna 701 consisting of a fixed housing 702 (which may include a radome, heat sink, control systems, interfaces, and mounting hardware), a plurality of lenses 303 (*a*), 303 (*b*) (shown as an outline only) and associated feed modules 355 (*a*), 355 (*b*). In this implementation, each feed module is implemented with two parallel feed regions, each consisting of a single row of feeds at a different frequency. The feed module 355 (*a*) serves as a Ka-band transmit module with 7 small Ka-band transmit feeds 302 (*a*), and a Ku-band combined transmit+receive module with three large Ku-band transmit and receive feeds 352 (*a*). The feed module 355 (*b*) serves as a Ka-band receive module with 5 small Ka-band receive feeds 302 (*a*), and a Ku-band combined transmit+receive module with three large Ku-band transmit and receive feeds 352 (*a*). Alternate implementations for number of rows for the Ku or Ka-band feeds and alternate numbers of feeds corresponding to different lens sizes, scan range, and/or performance are possible. A preferred implementation is to use two rows of feeds for each frequency, as well as to offset the feeds in separate rows and across feed modules to prevent gaps in coverage from lining up across the array. All of the feed modules 355 (*a*), 355 (*b*) are shown as connected together as a single PCB or other fixed support structure for the overall feed array 703.

FIG. 7(*b*) shows a different configuration 701*a* of the lens array antenna as set by the actuators, where the lenses have been moved to the right relative to the overall feed array 703, compared to the original configuration 701 where the lenses are centered over the overall feed array 703. FIG. 7(*c*) shows an additional modification where the lenses are shifted to a different offset distance r and the entire array (including the lenses and the overall feed array 703) inside the housing 702 is rotated to support steering the beams to a different desired angle or angles. FIG. 4(*a-c*) jointly illustrate the operation of the same terminal, where the controller and actuators physically rotate and shift the array and lenses to bring the linear feed regions underneath all of the lenses into alignment with the focal points of the one or two selected beams.

FIG. 8(*a-c*) show different cutaway views of an implementation of the electromechanical multi-beam terminal 801.

FIG. 8(*a*) shows a top view of a terminal implementation 801 with the radome removed, illustrating the housing 702, and the lens support structure (also referred to as the lens support plate) 803, which is depicted as holding the plurality of notional transmit and receive lenses. In this illustrated case, every lens 303 in the array acts as both a transmit and receive lens for the Ku frequency band, but the inner lenses 303 (*b*) act as receive lenses for the Ka frequency band, and the outer annular ring of lenses 303*a* act as transmit lenses for the Ku frequency band. However, similar principles may be used to implement a Ku-only array with separate receive and transmit lenses, a Ka-only array with combined Rx & Tx lenses, or arrays to support any combination of Ku-, Ka-, V-, X-, and/or Q-band SATCOM or terrestrial communications in the 1-100 GHz range. The entire lens plate 803 is shown as shifting left and right, as well as rotating about the center of the terminal 801.

FIG. 8(*b*) shows the top view of the terminal implementation 801 with the lens plate and lenses removed to reveal the overall feed array 703 with the attached dual-band feed modules 355*a*, 355*b*, with each feed module 355 (*a*), 355 (*b*) attached at a corresponding location to the lenses 303*a*, 303*b*. In this implementation, the outer ring of feed modules 355 (*a*) contain combined transmit and receive Ku feeds and transmit-only Ka-band feeds, while the inner feed modules 355 (*b*) contain combined transmit and receive Ku feeds and receive-only Ka-band feeds.

One of the significant challenges in a mechanically-actuated planar antenna structure is provision of power, signal, and control signals and removal of heat. A planar antenna with a radome in general cannot direct external (cool) air through the interior of the structure for direct cooling of individual components without introducing contaminants and moisture, which means that the system must be cooled from the bottom face of the terminal with a heat sink or liquid cooling system or similar. An electrically-steered antenna has a majority of the power-consuming and therefore heat-generating components distributed across the aperture, meaning that the majority of the heat must be conducted to a central point to then be conducted across rotating interface to reach the heat sink on the stationary platform. Any linear motion of the circuits relative to the rotation axis must also be accounted for by allowing the heat to be conducted away.

The mechanical, thermal, and electrical requirements for the rotation system combine to form a tight set of constraints for operation of the terminal. The electrical requirements can be met by a slip ring to carry the control signals, power, and user data multiplexed onto one or more conductors to enable a free-spinning implementation. A related implementation could involve inductive power coupling and wireless data transfer (inductive, RF, and/or optical communications) from the stationary to the rotating components.

The electrical requirement can also be met in a system with a limited angle of rotation by a cable tray and a fixed length of conductors. The fixed conductor length limits the rotation angle of the system to +/−180 or 360 deg. A fixed absolute rotation range relative to the platform limits the applicability of the terminal; as the platform moves (for example, a vehicle driving in a circle), periodic breaks in the connectivity would occur as the terminal reaches the maximum rotation angle and is forced to untwist the cable tray before continuing to track. The slip ring adds expense, especially for high-performance multi-conductor RF or optical slip rings, but the limited rotation angles without retrace imposed by the cable tray option introduces operational limitations.

The thermal solution is more challenging. A candidate cooling implementation could share the cable tray option by introducing a liquid coolant heat transfer path with hot and cold coolant lines or hoses communicated between the stationary and rotating platforms, or a concentric liquid rotary joint used to pass cold and hot coolant along a closed loop. However, any solution that includes liquid cooling even in a closed loop comes with severe disadvantages, including the weight of the liquid, inherent reliability challenges of any liquid joints, limits on low operational temperatures due to freezing, and a requirement of a pump for active circulation of the coolant. Better solutions combine the mechanical support and thermal interfaces together.

Conventional ball bearings are not designed to conduct significant amounts of heat, but alternate bearing structures are capable of significant thermal transfer. An air bearing composed of large interlocking top and bottom metal plates, potentially with corrugations to increase the surface area acts as both a low-friction bearing as well as a low-resistivity thermal transfer path when charged with compressed air to separate the two layers since air bearings typically operate with an air gap between 5-50 μm (microns). The use of an air bearing as a thermal transfer path has been illustrated by the Sandia cooler as disclosed in U.S. Pat. No. 9,850,907B2, “Cooling fan”, issued Jan. 26, 2017, in a different form. This solution is better than either liquid transfer solution because there are no risks of leaks and corrosion due to the presence of the liquid, but still requires compressed air from a small on-board air compressor.

Another implementation that improves over both the liquid and the air bearing options is to again combine the mechanical rotation and thermal transfer paths by using a very thin (approximately 50-500 μm (micron)) layer of low-friction polymer bearing material (such as PTFE or Igus® polymers) between two thermally conductive (i.e., aluminum or any other suitable material) structures. When a downward preload force is applied to keep the two plates in contact through the low-friction polymer, then the size of the contract region between the two plates (i.e., an annular ring with outer diameter between approximately 10 and 80 cm and inner diameter between approximately 0 and 75 cm) tightly in contact, then a good thermal path from the heat sources on the rotating feed array through the rotation joint to the heat sink or other thermal radiator at the base of the terminal. Any suitable method for operating the rotary and linear joints may be used.

A given implementations will use a combination of solutions, such as an edge or center-mounted ball bearing for mechanical support, a single or multi-conductor slip ring to carry control signals, power, and user data, and a cable tray with liquid hoses for cooling. A preferred cost and reliability-optimized implementation would use a large surface area polymer bearing with a preload for both thermal path and mechanical rotation, and a single-conductor slip ring with multiplexed transmit and receive RF signals, digital control signals, and DC power.

FIG. 8(*c*) is a side view of the terminal implementation 801 that illustrates the relationship of the various components of the terminal. From the top, the planar radome 851 is connected to the housing, mounting structure, and radome support frame 702, and ultimately the heat sink 853. A linear actuator 861 is provided to control the position of the lens plate 803 and lenses 303 relative to the feed array 703. An abstract actuator and rotation joint 855 logically provides mechanical, electrical, and thermal connectivity from the fixed housing 702 to the rotating internal platform containing the lenses and feeds depicted as the overall feed array and related support structure 703. The individual feed modules 355 are shown as sub-PCBs or modules soldered, bonded, or otherwise connected to the overall feed array support structure 703. Finally, the lenses 303 are installed above the feeds, rotate along with the feeds, and are jointly connected by a frame, plate, or other support structure 803 such that all of the lenses can move linearly along one axis relative to the underlying feeds 703.

FIG. 8(*d*) illustrates a terminal 801*a* constructed using one implementation option for the actuator and rotation joint 855. Here, the rotation is supported by central axis bearing 871 and edge-mounted geared ring 865 are used along with a drive actuator 863 to enable the feeds and lenses 703, 803 to be driven to rotate about the axis. The thermal transfer path and electrical connections for power, control, and user signals would be passed as a bundle of liquid-carrying hoses and cables 869 from the fixed base 702 to the rotating platform via a cable tray 867. The power, control, and signal cables would connect into a modular power supply bay 873 and one or more modem or multi-purpose circuitry bays 875 mounted beneath the heat sink 853. This cable tray would be configured to support rotation of +/−180 deg to +/−360 deg to minimize the number of retrace events. The multi-beam support of this terminal means that a retrace or unwind event of the cable would only require a break in one of the beams. Nonetheless, any break or limitation in the rotation range is undesirable.

FIG. 8(*e*) illustrates a modified terminal 801*b* constructed using a second implementation option for the rotation joint 855 that removes the fixed limit on the rotation range. In this implementation, the electrical signals are carried over a single or multi-conductor slip ring 581 placed on the central axis of the terminal 801*b*. The mechanical support bearing and thermal transfer path is selected to be an air bearing, where the tight tolerances and thin air layer of the bearing contribute to an efficient thermal transfer path from the feed array 703 through thermally conductive structures 883 to the top plate 885 of the air bearing across the thin air boundary (typically between 5 to 50 μm (microns)) to the bottom plate 887 and then into the heat sink 853. The air bearing is shown here as a top and bottom plate, but an additional retaining structure may be necessary above the rotating top plate for position control during shock and vibration events and support terminal operation across multiple terminal orientations. Since rotation speeds would be slow, the air bearing would require a source of compressed air, here shown as a small compressor 889 connected via hoses 888 to the supply holes of the air bearing plates 887. Since a large surface area is required to create the efficient thermal transfer path, a relatively low air pressure requirement in the range of approximately 20 to 345 kPa (3 to 50 PSI) can be supported. The air bearing implementation is preferred over the liquid cooling solution for reliability and mass reasons, but still introduces mechanical points of failure in the requirement for a small onboard diaphragm air compressor. Multiple, such as between about two to four, independent compressors would be used for reliability, with external mounting to support simple replacement in the case of failure.

FIG. 8(*f*) illustrates a modified terminal 801*c* constructed using a third implementation option for the rotation joint 855 that removes the requirement for either a liquid cooling path or an air compressor. The thermal path is changed from a thin air layer to a pair of planar thermally-conductive and load-bearing interfaces, including top 895 and bottom 897, separated by a thin (approximately 0.1 to 0.5 mm) layer of a low-friction low-wear self-lubricated polymer material 899. This implementation, when the size of the contact region and the thickness of the polymer are correctly selected, allows a low thermal resistance path from the top to the bottom of the rotating platform while also acting as the bearing. At the relatively low rotation speeds (approximately <200 degree/sec) and irregular service (average operation will be approximately <10 degree/sec), polymer bearing materials are highly effective and reliable, with no requirement for external lubrication or maintenance. This implementation 801*c* is preferred for the design simplicity and reduced cost compared to 801 (*a*), 801 (*b*).

Figure 9:
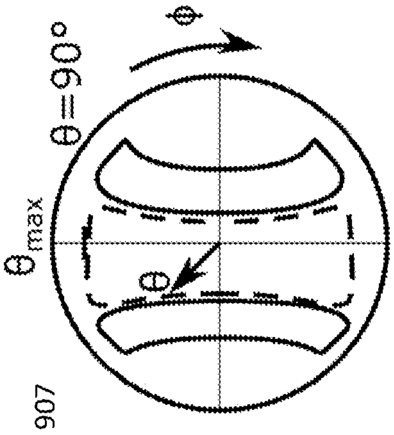
FIG. 9(*a*) illustrates an example alternate three-row arrangement of dual-band feeds for reduced array rotation requirements during retrace, beam handover, and new beam initialization events that can be utilized in accordance with various embodiments.
Figure 9:
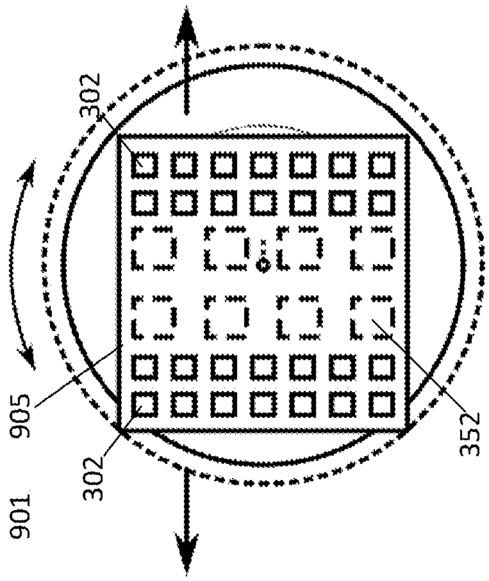

Referring now to FIGS. 9(*a*) and 9(*b*), in the case of using a rotation solution with a limited range of supported rotation angles, such as implementation 801*a*, or for cases in which there are many handovers between satellites (such as when operating with connections to two NGSO constellations, one at Ku and one at Ka, at the same time), then many instances where the rotation platform must rotate by at least 180 degree to support establishing the second beam will occur. While the terminal is retracing or rotating in large steps, then only one beam is supported, and this represents a short time duration where the second beam is unavailable. To reduce the time lost to retrace events, even with a free-spinning rotation system, a modified feed module 905 for lens module 901 is shown in FIG. 9(*a*) with corresponding coverage plot 907 as shown in FIG. 9(*b*) can be used. By adding an additional Ka-band linear feed region such that there are two rows of Ka feeds, then two rows of Ku feeds, then an additional two rows of Ka feeds, there are now two angular solutions available for each pair of desired beam locations. In this way, the maximum/worst-case retrace angle for a new beam angle will be a 90 degree rotation rather than a 180 degree rotation, minimizing the time spent in single-beam mode and increasing the communications availability of the system.

Figure 10:
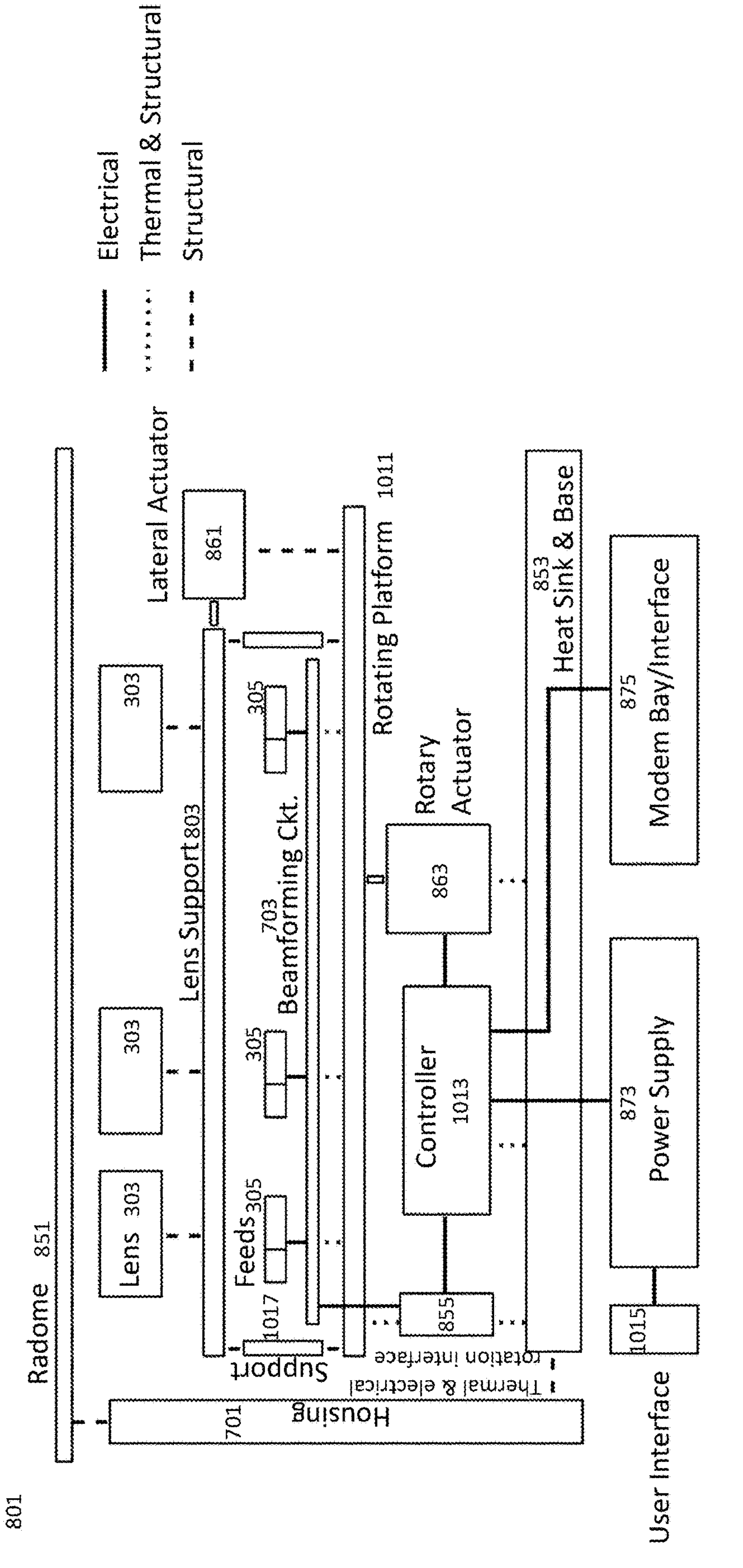
FIG. 10 is a logical block diagram illustrating example components of the multi-beam electro-mechanical SATCOM terminal that can be utilized in accordance with various embodiments.

FIG. 10 shows a logical block diagram of the construction of the terminal 801 and the interactions between the different components. From the top, the radome 851 is structurally connected to the housing 701, which is connected to the heat sink and base 853. The heat sink 853 dissipates the heat generated by the beamforming circuits on the overall feed array 703 and feed modules 305, where the heat is conducted from top to bottom through the rotation interface. The heat sink and base 853 provides structural support to the rotary actuator 863 and rotation interface 855. Power to the entire system is provided from the power supply 873 bay through controller 1013. The external user interface 1015 is provided through the power supply bay 873, including external power connections, ethernet and user data connections, and other control and management signals. RF connections to modems or the provision for on-board modems are provided through the modem bay interface 875 which is connected through the controller 1013 and rotation interface 855 to the rotating platform 1011 and ultimately beamforming circuitry 703 and feed modules 305. The rotary actuator 863 and lateral linear actuator 861 are controlled and powered through the controller 1013. The rotary actuator drives the rotating platform 1011 and all structures mounted to that platform, including the beamforming circuits 703, lateral actuator 861, and the lenses 303 through the lens support plate 803 itself supported by underlying supports 1017. The differentiating factor from the prior art is the presence of the linear actuator and ability for the lenses to slide along an axis to bring different scan angles into view of the same linear feed region, as well as the presence of multiple rows of feeds and feeds for multiple frequency bands. The addition of the sliding lenses relative to the feeds allows this single planar aperture under a low-profile radome to steer any two beams within the approximately hemispherical field of view with a limited number of beamforming circuits and only two actuators. Embodiments with either a single feed design for a single band or multiple feed designs for multiple bands support steering multiple beams from the same terminal across multiple frequency bands, such as Ka+Ku, Ka+X, Ku+V, etc.

It is noted that the drawings may illustrate, and the description and claims may use geometric or relational terms, such as side, edge, top, bottom, planar, coplanar, parallel, perpendicular, rectangular, square, triangular, circular, polygon, pentagon, equilateral triangle, irregular polygon, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The aspects of the disclosure are not restricted to the details of any foregoing embodiments. Aspects of the disclosure extend to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A multi-beam electromechanically actuated lens antenna, comprising:

a) an RF lens having one or more focal locus;

b) one or more feed modules having a region of feeds, the region of feeds covering a subset of the one or more focal locus of the lens;

c) a first actuator configured to rotate the lens and the one or more feed module together to scan in at least one direction;

d) a second actuator configured to offset the lens from the region of feeds along one of the one or more focal locus of the lens; and e) a plurality of focal points on the one or more focal locus, wherein the first actuator or the second actuator or both the first actuator and the second actuator is configured to position the region of feeds relative to the RF lens so as to enable a beam to be generated at each of two or more of the plurality of focal points on the one or more focal locus.

2. The antenna of claim 1, wherein the region of feeds is conformal to the subset of the one of more focal locus of the lens.

3. The antenna of claim 1, wherein the first actuator is configured to rotate the lens and the one or more feed module together to scan in azimuth.

4. The antenna of claim 1, wherein the region of feeds comprises one or more rows of feeds.

5. The antenna of claim 4, wherein the one or more rows of feeds are offset to minimize the maximum distance of the focal point from the closest feed within the regions of feeds.

6. The antenna of claim 1, wherein one or more of the feed modules provide only transmit functionality and one or more of the feed modules provide only receive functionality.

7. The antenna of claim 1, wherein each of the one or more feed modules provide full-duplex transmit and receive functionality.

8. The antenna of claim 1, wherein each of the one or more feed modules provide half-duplex transmit and receive functionality.

9. The antenna of claim 1, wherein any two of the plurality of focal points of the RF lens can be selected simultaneously.

10. The antenna of claim 1, wherein the region of feeds is substantially linear.

11. The antenna of claim 1, wherein the second actuator is configured to offset the lens from the region of feeds along one of the one or more focal locus of the lens in a direction perpendicular to the line of feeds.

12. A multi-beam multi-band electromechanically actuated lens antenna, comprising:

a) an RF lens having one or more focal locus;

b) one or more feed modules having a plurality of regions of feeds, each of the plurality of regions of feeds covering a different subset of the one or more focal locus of the lens;

c) each of the plurality of regions of feeds operates in a different frequency band;

d) a first actuator configured to rotate the lens and the one or more feed module together to scan in at least one direction;

e) a second actuator configured to offset the lens from the plurality of regions of feeds along one of the one or more focal locus of the lens; and f) a plurality of focal points on the one or more focal locus, wherein the first actuator or the second actuator or both the first actuator and the second actuator is configured to position the region of feeds relative to the RF lens so as to enable an independent beam to be generated at each of two or more of the plurality of focal points on the one or more focal locus, each beam being a dual band beam.

13. The antenna of claim 12, wherein each of the regions of feeds is conformal to the respective subset of the one of more focal locus of the lens.

14. The antenna of claim 12, wherein the first actuator is configured to rotate the lens and the one or more feed module together to scan in azimuth.

15. The antenna of claim 12, wherein a first region of feeds covers Ka-band and a second region of feeds covers Ku-band.

16. The antenna of claim 12, wherein a first region of feeds covers Ka-band and a second region of feeds covers X-band.

17. The antenna of claim 12, wherein a first region of feeds covers Ku-band and a second region of feeds covers X-band.

18. The antenna of claim 12, wherein a first region of feeds covers Ka-band and a second region of feeds covers V-band.

19. The antenna of claim 12, wherein the one or more focal locus is planar.

20. The antenna of claim 12, wherein the one or more focal locus is non-planar.

21. The antenna of claim 12, wherein the plurality of regions of feeds are substantially linear.

22. The antenna of claim 12, wherein the plurality of regions of feeds are substantially parallel.

23. A multi-beam electromechanically actuated lens array antenna, comprising:

a) a plurality of RF lenses forming an array, the plurality of RF lenses having one or more lens focal locus;

b) each RF lens of the plurality of RF lenses in the array is associated with one or more of the same feed modules having one or more regions of feeds covering one or more subsets of the one or more lens focal locus;

c) the one or more feed modules oriented and located substantially across the array relative to the plurality of RF lenses;

d) a first actuator configured to rotate the plurality of RF lenses and the region of feeds together to scan in at least one direction; and e) a second actuator configured to offset jointly the plurality of RF lenses from the respective one or more regions of feeds associated with each RF lens along the one or more lens focal locus.

24. The antenna of claim 23, wherein each of the one or more regions of feeds is conformal to the respective subset of the one of more focal locus of the lens.

25. The antenna of claim 23, wherein the first actuator is configured to rotate the plurality of RF lenses and the region of feeds together to scan in azimuth.

26. The antenna of claim 23, wherein each of the one or more regions of feeds of the one or more feed modules across the array of RF lenses operates in a different frequency band.

27. The antenna of claim 23, wherein the location of the one or more feed modules relative to their respective RF lens are offset from the location of the one or more feed modules relative to a separate RF lens across the plurality of RF lenses to reduce scan ripple and gaps in coverage.

28. The antenna of claim 23, wherein heat is conducted from the one or more feed modules through a liquid cooling loop using a rotary cable tray, the heat to be dissipated in a heat sink.

29. The antenna of claim 23, wherein heat is conducted from the one or more feed modules through an air bearing, the heat to be dissipated in a heat sink.

30. The antenna of claim 23, wherein heat is conducted from the one or more feed modules through a thin polymer bearing, the heat to be dissipated in a heat sink.

* * * * *